US011299141B1

(12) United States Patent
McKinzie et al.

(10) Patent No.: US 11,299,141 B1
(45) Date of Patent: Apr. 12, 2022

(54) SYSTEM FOR MULTI-LAYER BRAKING AND RETARDATION IN A WORK VEHICLE (71) Applicant: Deere & Company, Moline, IL (US)

(72) Inventors: Kyle K. McKinzie, Oswego, KS (US); Clayton G. Janasek, Independence, MO (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/172,740

(22) Filed: Feb. 10, 2021

(51) Int. Cl.
*B60W 20/14* (2016.01)
*B60W 10/101* (2012.01)
(Continued)

(52) U.S. Cl.
CPC ............ *B60W 20/14* (2016.01); *B60W 10/06* (2013.01); *B60W 10/101* (2013.01); *B60W 10/196* (2013.01)

(58) Field of Classification Search
CPC .... B60W 10/06; B60W 10/08; B60W 10/101; B60W 10/18; B60W 10/196;
(Continued)

(56) References Cited

U.S. PATENT DOCUMENTS 3,214,987 A 11/1965 Schenck et al.
3,626,787 A 12/1971 Singer
(Continued)

FOREIGN PATENT DOCUMENTS

CN 101255907 A 9/2008
CN 102844588 A 12/2012
(Continued)

OTHER PUBLICATIONS

Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
(Continued)

*Primary Examiner* — Edwin A Young
(74) *Attorney, Agent, or Firm* — Klintworth & Rozenblat IP LLP (57) ABSTRACT

A control system is provided for implementing multi-layer braking and retardation in a work vehicle that includes a hybrid electric drive system having an engine and one or more electric machines. The control system includes a braking and retardation system that dissipates energy generated by motion of the work vehicle, with the braking and retardation system including a brake resistor, an engine brake, and a transmission operable to provide transmission braking. A controller receives inputs on a braking torque demand and operational parameters of the hybrid electric drive system and the braking and retardation system, determines an amount of energy absorption necessary to meet the braking torque demand, and allocates the energy to be absorbed within the braking and retardation system according to a hierarchal energy allocation scheme based on the energy to be absorbed and the operational parameters of the hybrid electric drive system and braking and retardation system.

20 Claims, 4 Drawing Sheets

(51) Int. Cl.
*B60W 10/196* (2012.01)
*B60W 10/06* (2006.01)

(58) Field of Classification Search
CPC .... B60W 10/198; B60W 10/26; B60W 10/30; B60W 20/00; B60W 20/14; B60W 30/18109; B60W 30/18127; B60W 30/18136
See application file for complete search history.

(56) References Cited

U.S. PATENT DOCUMENTS

| | | |
|---|---|---|
| 3,651,904 A | 3/1972 | Snoy et al. |
| 3,714,845 A | 2/1973 | Mooney, Jr. |
| 3,783,711 A | 1/1974 | Orshansky, Jr. |
| 4,090,414 A | 5/1978 | White |
| 4,164,155 A | 8/1979 | Reed et al. |
| 4,164,156 A | 8/1979 | Reed |
| 5,156,577 A | 10/1992 | Fredriksen et al. |
| 5,353,662 A | 10/1994 | Vaughters |
| 5,508,574 A | 4/1996 | Vlock |
| 5,931,757 A | 8/1999 | Schmidt |
| 6,254,509 B1 | 7/2001 | Meyer |
| 6,394,925 B1 | 5/2002 | Wontner et al. |
| 6,478,705 B1 | 11/2002 | Holmes et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,329,201 B2 | 2/2008 | Raghavan et al. |
| 7,367,911 B2 | 5/2008 | Raghavan et al. |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan et al. |
| 7,479,081 B2 | 1/2009 | Holmes |
| 7,491,144 B2 | 2/2009 | Conlon |
| 7,669,534 B2 | 3/2010 | Kumar et al. |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,469,127 B2 | 6/2013 | Tarasinski et al. |
| 8,500,585 B2 | 8/2013 | Kim et al. |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Farasinski et al. |
| 8,708,072 B2 | 4/2014 | Montocchio et al. |
| 8,733,489 B2 | 5/2014 | Heine et al. |
| 8,734,281 B2 | 5/2014 | Ai et al. |
| 8,747,266 B2 | 6/2014 | Aitzetmueller et al. |
| 8,784,246 B2 | 7/2014 | Treichel et al. |
| 8,790,202 B2 | 7/2014 | Sakai et al. |
| 8,897,983 B2 | 11/2014 | Stander et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,097,342 B2 | 8/2015 | Dix et al. |
| 9,206,885 B2 | 12/2015 | Rekow et al. |
| 9,487,073 B2 | 11/2016 | Love et al. |
| 9,506,509 B1 | 11/2016 | Fowler et al. |
| 9,562,592 B2 | 2/2017 | Rekow et al. |
| 9,573,583 B2 | 2/2017 | Rindfleisch et al. |
| 9,616,756 B2 | 4/2017 | Fritz et al. |
| 9,944,163 B2 | 4/2018 | McKinzie |
| 9,981,665 B2 | 5/2018 | Rekow et al. |
| 10,119,598 B2 | 11/2018 | Rekow et al. |
| 10,670,124 B2 | 6/2020 | Rekow et al. |
| 2003/0186769 A1 | 10/2003 | Ai et al. |
| 2004/0094381 A1 | 5/2004 | Versteyhe |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2008/0174174 A1 | 7/2008 | Burns et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller et al. |
| 2013/0023370 A1 | 1/2013 | Grad et al. |
| 2014/0018201 A1 | 1/2014 | Tolksdorf |
| 2014/0248986 A1 | 4/2014 | Weeramantry et al. |
| 2014/0128196 A1 | 5/2014 | Rintoo |
| 2014/0315685 A1 | 10/2014 | Holler |
| 2014/0316669 A1* | 10/2014 | Rudberg ............... B60T 13/586 701/70 |
| 2015/0006007 A1 | 1/2015 | Kitahata et al. |
| 2015/0072823 A1 | 3/2015 | Rintoo |
| 2015/0142232 A1 | 5/2015 | Tabata et al. |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1 | 9/2016 | Watanabe et al. |
| 2016/0332631 A1* | 11/2016 | Roos ................... B60W 10/196 |
| 2016/0347296 A1* | 12/2016 | Mueller ............... B60T 13/585 |
| 2017/0066447 A1 | 3/2017 | Hertel et al. |
| 2017/0102059 A1 | 4/2017 | Rekow et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0043764 A1 | 2/2018 | McKinzie et al. |
| 2018/0149247 A1 | 5/2018 | Rekow et al. |
| 2018/0298993 A1 | 10/2018 | Fliearman et al. |
| 2019/0337376 A1 | 11/2019 | Ore |
| 2019/0346036 A1 | 11/2019 | Ore et al. |
| 2019/0389468 A1* | 12/2019 | Fritz ..................... B60W 20/14 |
| 2020/0309258 A1 | 10/2020 | McKinzie et al. |
| 2021/0009003 A1 | 1/2021 | Stander et al. |

FOREIGN PATENT DOCUMENTS

| | | |
|---|---|---|
| DE | 1173348 B | 7/1964 |
| DE | 4010919 A1 | 10/1991 |
| DE | 19621200 A1 | 11/1997 |
| DE | 19954636 A1 | 5/2001 |
| DE | 201500200973 A1 | 5/2001 |
| DE | 10128076 A1 | 12/2002 |
| DE | 10319252 A1 | 11/2004 |
| DE | 102006041160 A1 | 9/2008 |
| DE | 202009007972 U1 | 5/2010 |
| DE | 11545 U1 | 12/2010 |
| DE | 102010021846 A1 | 12/2011 |
| DE | 10201102210 A1 | 7/2012 |
| DE | 102011102184 A1 | 7/2012 |
| DE | 112006002537 B4 | 8/2012 |
| DE | 10201105868 A1 | 1/2013 |
| DE | 102011115002 A1 | 4/2013 |
| DE | 102013220167 A1 | 4/2015 |
| DE | 202015102282 U1 | 5/2015 |
| DE | 102014225298 A1 | 7/2015 |
| DE | 102015215461 A1 | 2/2016 |
| DE | 102016120965 A1 | 5/2017 |
| DE | 102016204727 A1 | 9/2017 |
| DE | 102018105810 A1 | 10/2018 |
| DE | 102018212712 A1 | 1/2019 |
| EP | 01099882 A2 | 10/1991 |
| EP | 805059 A2 | 11/1997 |
| EP | 01707416 | 8/2007 |
| EP | 02855226 | 8/2007 |
| EP | 02466168 | 6/2012 |
| EP | 02466169 | 6/2012 |
| WO | 2008019799 A2 | 2/2008 |
| WO | 2011092643 A1 | 8/2011 |
| WO | 2012171812 A1 | 12/2012 |

(56) References Cited

FOREIGN PATENT DOCUMENTS

OTHER PUBLICATIONS

John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
CNIPA Office Action for Application No. 201510165982.4 dated Aug. 9, 2018, Serial Notice No. 2018080601675890.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.
German Search Report for application No. 102018212712 dated Apr. 12, 2019.
German Search Report for application No. 102019205211 dated Sep. 5, 2019.
German Search Report for application No. 102019204706 dated Dec. 17, 2019.
German Search Report for German application No. 1020202026513 dated Sep. 1, 2020.
USPTO, Office Action in U.S. Appl. No. 14/249,258 dated Apr. 21, 2017.
USPTO, Office Action in U.S. Appl. No. 14/249,258 dated Aug. 22, 2017.
USPTO, Office Action in U.S. Appl. No. 14/249,258 dated Oct. 17, 2016.
USPTO, Office Action in U.S. Appl. No. 14/536,097 dated Sep. 25, 2017.
USPTO, Office Action in U.S. Appl. No. 15/664,289 dated Jul. 26, 2018.
USPTO, Office Action in U.S. Appl. No. 15/664,289 dated Dec. 13, 2018.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
USPTO, Office Action in U.S. Appl. No. 15/628,979 dated Nov. 5, 2019.
USPTO, Office Action in pending U.S. Appl. No. 15/971,867 dated Dec. 12, 2019.
USPTO, Office Action in U.S. Appl. No. 16/371,598 dated Jul. 21, 2020.
USPTO, Final Office Action in U.S. Appl. No. 15/971,867 dated Jun. 24, 2020.
USPTO, Non-Final Office Action issued in U.S. Appl. No. 16/555,913 dated Jan. 4, 2021.
Deere & Company, Utility U.S. Appl. No. 16/670,210, filed Oct. 31, 2019.
Deere & Company, Utility U.S. Appl. No. 16/555,913, filed Aug. 29, 2019.
Deere & Company, Utility U.S. Appl. No. 16/946,685, filed Jul. 1, 2020.
Deere & Company, Utility U.S. Appl. No. 17/066,746, filed Oct. 9, 2020.
Deere & Company, Utility U.S. Appl. No. 17/154,729, filed Jan. 21, 2021.
Deere & Company, Utility U.S. Appl. No. 17/171,856, filed Feb. 9, 2021.

\* cited by examiner

SYSTEM FOR MULTI-LAYER BRAKING AND RETARDATION IN A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to a braking system for a work vehicle and, more particularly, a multi-layer braking and retardation system for a work vehicle.

BACKGROUND OF THE DISCLOSURE

Large work vehicles, such as articulated dump trucks, semi-trucks and the like often require a large amount of braking power to control the speed of the vehicle, especially when the vehicle is descending a steep grade or is carrying a heavy payload. Work vehicles are thus typically equipped with at least two types of braking systems, with both a friction brake system and a retarder system being used. Friction braking systems are effective in slowing the vehicle but are subject to wear and require maintenance or replacement if used too frequently. Retarder systems can include devices such as engine brakes and fluid retarders, for example, that are able to lessen the speed of the vehicle via controlling of the engine or transmission in the vehicle. Engine brakes use pressure created within the engine, including controlling or altering of compression strokes in the engine by selective operation of exhaust valves, to slow the vehicle. Fluid retarders may be provided in the transmission to absorb a portion of the momentum associated with the vehicle, with a viscous drag being induced on fluid pumped through the retarder to absorb energy through the drive shaft and thereby slow the vehicle.

SUMMARY OF THE DISCLOSURE

A control system for providing multi-layer braking and retardation in a work vehicle that includes a hybrid electric drive system having an engine and one or more electric machines is provided. The control system includes a braking and retardation system configured to dissipate energy generated by motion of the work vehicle, with the braking and retardation system further including a brake resistor, an engine brake, and a transmission operable to provide transmission braking. The control system also includes a controller, including a processor and memory architecture, that is operably connected to the hybrid electric drive system and the braking and retardation system. The controller is configured to receive a plurality of inputs comprising a braking torque demand from an operator and operational parameters of the hybrid electric drive system and the braking and retardation system, determine an amount of energy absorption necessary in the work vehicle to meet the braking torque demand, and allocate the energy to be absorbed within the braking and retardation system according to a hierarchal energy allocation scheme, with the energy allocated based on the determined amount of energy absorption and the operational parameters of the hybrid electric drive system and the braking and retardation system.

In another implementation, a work vehicle includes a drive train including an engine, one or more electric machines, and a transmission to selectively transfer power from at least one of the engine and the one or more electric machines to an output shaft. The work vehicle also includes a braking and retardation system configured to dissipate energy generated by motion of the work vehicle, with the braking and retardation system having a brake resistor, an engine brake, and transmission braking provided by the transmission. The work vehicle further includes a controller, including a processor and memory architecture, in communication with the drive train and the braking and retardation system. The controller is configured to receive a plurality of inputs comprising a braking torque demand and operational parameters of the drive train and the braking and retardation system, determine an amount of energy absorption necessary in the work vehicle to meet the braking torque demand, and allocate the energy to be absorbed within the braking and retardation system according to a hierarchal energy allocation scheme, with the energy allocated based on the determined amount of energy absorption and the operational parameters of the drive train and the braking and retardation system.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, work vehicles such as dump trucks and semi-trucks often utilize a retarder system to provide braking power when descending a steep grade or carrying a heavy payload. In work vehicles with conventional transmissions, the retarder system may utilize a dedicated fluid retarder or an existing torque converter operated as a fluid retarder to provide retardation in the vehicle by absorbing a portion of the momentum associated with the vehicle. The fluid retarder may be mounted directly on the transmission, with vanes of the fluid retarder attached to a transmission driveshaft between the clutch and road wheels. The vanes are enclosed in a static chamber with small clearances to the chamber's walls, which are also vaned. When the fluid retarder is actuated, compressed air pumps fluid (e.g., a standard transmission fluid (gear oil), a separate oil supply, or water) into the chamber, which has a stator at one side and a rotor on the other side. The rotary motion of the rotor accelerates the fluid and creates a torque that pulls the rotor via a helical gear. The stator moves the fluid back to the rotor, with this action creating a braking torque or viscous drag that causes the rotor to decelerate, thereby delivering breaking power to the driving wheels of the vehicle. In operation, the fluid retarder is able to dissipate a large amount of the energy generated by the vehicle, such that it is an effective mechanism for providing braking power.

While fluid retarders are effective in providing braking power in work vehicles, it is recognized that it may be impractical to include a fluid retarder in certain work vehicles and the transmission system thereof. For example, in work vehicles having a hybrid electric transmission (or electric Infinitely Variable Transmission (eIVT)), a torque converter or dedicated fluid retarder may not typically be included, and the addition of such a fluid retarder may be cost prohibitive and cumbersome to package on the vehicle. However, excluding a fluid retarder from the work vehicle can result in there being a large amount of vehicular energy remaining that must be dissipated via other means of braking and retardation.

To provide for energy dissipation in a work vehicle without use of a fluid retarder, a control system is provided for a work vehicle with a hybrid electric drive train that implements a multi-level braking and retardation scheme in the vehicle. The control system utilizes a variety of energy storage and dissipation devices to absorb energy in the vehicle, including battery storage, a brake resistor, an engine brake, axle service brakes, engine friction, cooling fans, and other engine accessories. The control system may be implemented with an eIVT system, with the control system operating the eIVT to provide transmission braking as an additional means for absorbing energy.

In an embodiment, the control system implements a closed-loop control scheme to apply multi-level braking and retardation control for the work vehicle. In implementing the control scheme, a controller in the control system receives operator commands regarding a requested braking torque for the work vehicle. The controller calculates the amount of power that would need to be absorbed in the vehicle to accommodate the braking torque and compares the calculated power against a plurality of vehicle operating parameters that are monitored in the work vehicle to determine an appropriate scheme for allocating the power between energy storage and dissipation devices in the work vehicle. The controller then allocates the power between energy storage and dissipation devices in the vehicle using a multi-layer, hierarchical approach that allocates the power in an optimal manner. According to an example, the controller provides an ordered allocation of the retarding power that optimizes the use and dissipation of that power. The power may first be directed to one or more energy storage devices (e.g., a battery pack) in the work vehicle to store as much of the power as possible. Remaining power is then allocated between other accessories on the work vehicle that may consume power and to non-wear components of the work vehicle that can dissipate large amounts of the power. As still further means for dissipating power, wear components on the vehicle may be engaged to further dissipate power in the work vehicle.

In one embodiment, the controller may also modify the braking torque requested in the operator commands if the power that needs to be absorbed in association with that command is too high to accommodate in the vehicle. The controller may issue a back-off command to reduce the requested braking torque for the work vehicle and thereby lessen the amount of power that must be absorbed in the vehicle. Via use of a back-off command, in combination with allocating the power between energy storage and dissipation devices of the vehicle as described above, the control system provides protection to various devices of the work vehicle, including the engine, brakes, and transmission clutches, for example.

Example embodiments of a work vehicle having a hybrid electric transmission and control system that implements a multi-level braking and retardation scheme in the vehicle are provided in FIGS. 1-4 according to this disclosure. The following examples notwithstanding, other types of work vehicles and other configurations of hybrid electric transmission systems would also benefit from the multi-level braking and retardation scheme of the invention being incorporated therein. It is therefore recognized that aspects of the invention are not meant to be limited only to the specific embodiments described hereafter.

Figure 1:
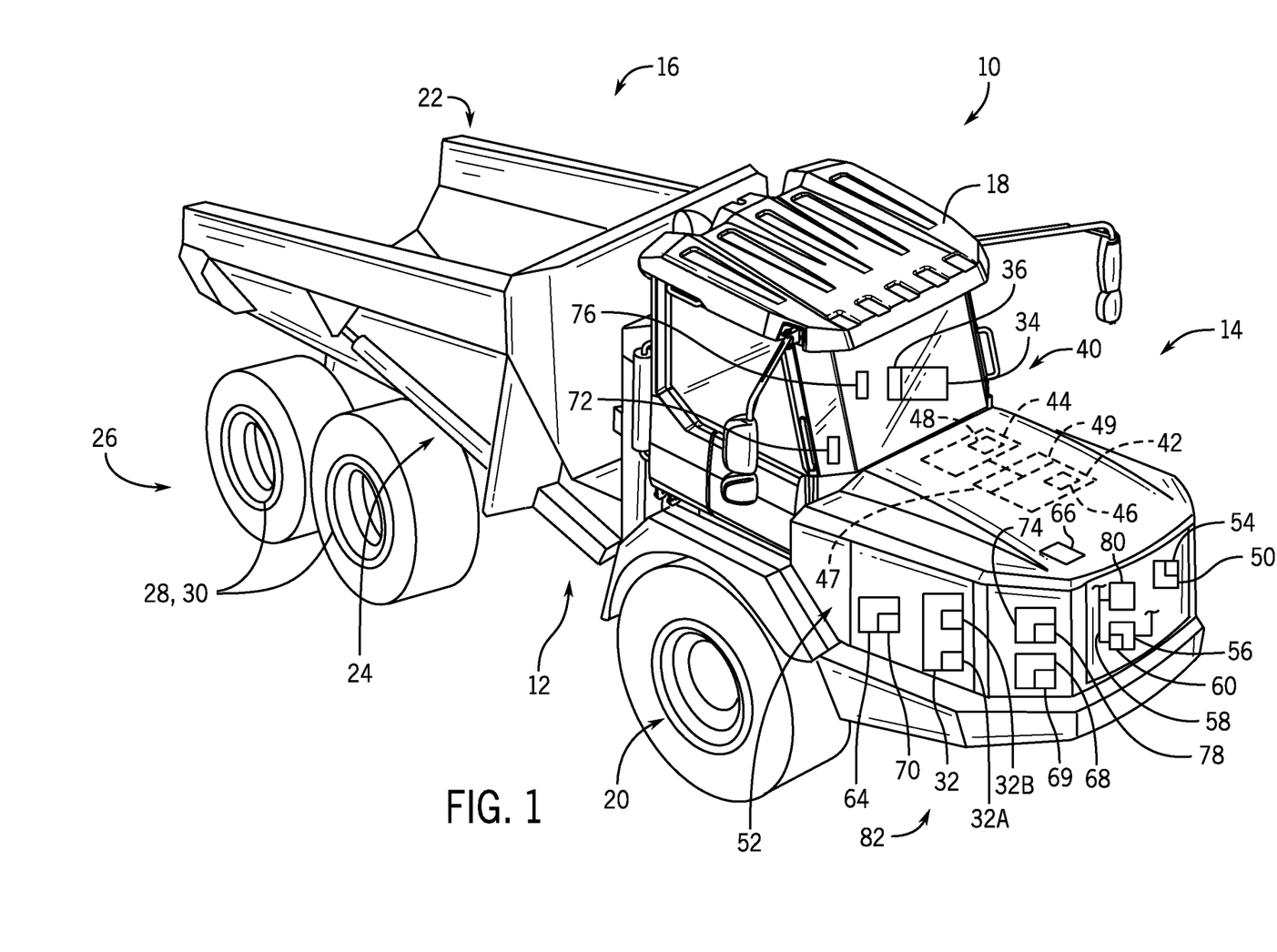
FIG. 1 illustrates an example work vehicle incorporating a control system that provides multi-layer braking and retardation, in accordance with an embodiment.

Example Embodiments of a System for
Multi-Layer Braking and Retardation in a Work
Vehicle Referring initially to FIG. 1, a work vehicle 10 is shown that can implement embodiments of the invention. In the illustrated example, the work vehicle 10 is an articulated dump truck, but it is understood that other vehicle configurations may be possible, including configurations with the work vehicle 10 as a different kind of off-highway vehicle. The work vehicle 10 includes a chassis or frame 12 on which a cab portion 14 and a trailer portion 16 are mounted. The cab portion 14 includes a cab 18 in which an operator may be seated during operation of the vehicle 10. A front wheel assembly 20 supports the cab portion 14 and is operably coupled to the frame 12. The trailer portion 16 includes a dump body or bin 22 supported by the frame 12, with the bin 22 defining a receptacle that can receive a payload. One or more actuators, such as hydraulic cylinders 24, may be coupled to the bin 22 for angularly elevating the bin 22 relative to the frame 12. A rear wheel assembly 26 supports the trailer portion 16 and is operably coupled to the frame 12, with the rear wheel assembly 26 including two sets of wheels 28, 30.

The work vehicle includes a controller 32 (or multiple controllers) to control various aspects of the operation of the work vehicle 10. Generally, the controller 32 (or others) may be configured as a computing device with associated processor devices 32a and memory architectures 32b, as a hard-wired computing circuit (or circuits), as a programmable circuit, as a hydraulic, electrical, or electro-hydraulic controller, or otherwise. As such, the controller 32 may be configured to execute various computational and control functionality with respect to the work vehicle 10. In some embodiments, the controller 32 may be configured to receive input signals in various formats (e.g., as hydraulic signals, voltage signals, current signals, and so on), and to output command signals in various formats (e.g., as hydraulic signals, voltage signals, current signals, mechanical movements, and so on).

The controller 32 may be in electronic, hydraulic, mechanical, or other communication with various other systems or devices of the work vehicle 10. For example, the controller 32 may be in electronic or hydraulic communication with various actuators, sensors, and other devices within (or outside of) the work vehicle 10, including various devices described below. The controller 32 may communicate with other systems or devices (including other controllers) in various known ways, including via a CAN bus (not shown) of the work vehicle 10, via wireless or hydraulic communication means, or otherwise. An example location for the controller 32 is depicted in FIG. 1; however, it is understood that other locations on the work vehicle 10 are possible.

In some embodiments, the controller 32 may be configured to receive input commands and to interface with an operator via a human-vehicle interface 34 that may be disposed inside the cab 18 of the work vehicle 10 for easy access by the operator. The human-vehicle interface 34 may be configured in a variety of ways. In some embodiments, the human-vehicle interface 34 may include an input device 36 with one or more joysticks, various switches or levers, one or more buttons, a touchscreen interface that may be overlaid on a display, a keyboard, or various other human-machine interface devices.

As described in greater detail below, the controller 32 may facilitate the input of various types of operator commands and collection of various types of vehicle operating parameter data associated with the work vehicle 10 as part of operation of a control system 40 that implements a multi-level braking and retardation scheme in the vehicle 10—with the control system 40 understood as including the controller 32 and a plurality of energy storage and dissipation devices in the work vehicle 10, and with aspects of the control system 40 being implemented on/by the controller 32. As indicated above, operator commands may be input to the controller 32 via the human-vehicle interface 34, while the vehicle operational parameter data may be in the form of raw data from the applicable sensors described below (or other sources) or undergo some processing in the controller 32 to extract the desired characteristics. Inputs and data received by the controller 32 are utilized by the control system 40 to provide braking and retardation control in the work vehicle 10 via a variety of energy storage and dissipation devices therein, on which further details will be provided below.

The work vehicle 10 includes a source of propulsion that, in an example embodiment, is provided as a hybrid electric drive system that includes an engine 42 and one or more electric machines 47, 49. The engine 42 and the electric machine(s) 47, 49 may supply power to a transmission 44.

In one example, the engine 42 is an internal combustion engine, such as a diesel engine, that is controlled by the controller 32 to enable start-up of the engine 42, enable shutdown of the engine 42, disable operation of the engine 42, and/or to modify some aspect of operation of the engine 42 or associated system, for example, based on input received from the human-vehicle interface 34. The work vehicle 10 may include an engine speed sensor 46 configured to determine the speed of the engine 42 during operation.

In one example, the electric machine(s) 47, 49 are AC motors, such as permanent magnet AC motors or induction motors. In one implementation, and as will be explained in greater detail in FIG. 2, a first electric machine 47 may receive mechanical power from the engine 42 and convert this power to electrical power, with electrical power from the first electric machine 47 then being provided to the second electric machine 49. This electrical power may then be re-converted by the second electric machine 49 for mechanical output. The electric machine(s) 47, 49 may be controlled by the controller 32 to control a speed and operational mode thereof, with the electric machine(s) 47, 49 being operable in both a "motoring mode" to convert electrical energy into mechanical energy and in a "regenerative mode" to convert mechanical energy into electric energy.

The transmission 44 transfers power from the engine 42 and/or electric machine(s) 47, 49 to a suitable driveline (not shown) coupled to driven wheels of the work vehicle 10, which may include the front wheel assembly 20 and/or the rear wheel assembly 26, to enable the work vehicle 10 to move. As described in greater detail below when referring to FIG. 2, the transmission 44 may be configured as a hybrid electric transmission or eIVT that combines outputs from both the engine 42 and the electric machines 47, 49 to provide a final power delivery (e.g., to a vehicle axle), on which further details will be provided below. The transmission 44 may include sensors 48 that measure one or more characteristics of the transmission 44, such as the transmission output speed, transmission gear, and transmission oil temperature, for example. In one example, the transmission 44 is controlled by the controller 32 to enable or disable motion of the work vehicle 10, for example, based on input received from the human-vehicle interface 34, as part of a multi-level braking and retardation scheme implemented by the control system 40.

The work vehicle 10 may further include a lubrication system 50 associated with the engine 42 and/or other portions of the work vehicle 10. The lubrication system 50 may be controlled according to signals from the controller 32 to circulate a liquid lubricant (e.g., oil) around the engine 42 (e.g., pistons, cylinders, bearings) and/or to other components of the work vehicle 10, such as axles 52 of the vehicle 10. Although not shown in detail, the lubrication system 50 may include components such as an oil reservoir, conduits, and pumps to circulate the lubricant to and from the engine 42 and other applicable components. In one example, the lubrication system 50 may include one or more sensors 54 to measure one or more lubrication system characteristics. In one example, the sensors 54 may include a temperature sensor to measure the temperature of the lubricant at one or more locations within the lubrication system 50, such as the oil temperature at the axle(s) 52. In one embodiment, the controller 32 may receive the temperature readings from the sensors 54 and may control the lubrication system 50 and/or alter operation of the control system 40 based on the temperature readings.

The work vehicle 10 may further include an energy storage device 56 that is electrically connected to other electrical components in the vehicle via a DC bus 58. The energy storage device 56 may be configured as a high-voltage or high-power energy storage device and, according to one example, may be a battery or battery pack—such that the energy storage device is hereafter referred to as "battery assembly 56." The battery assembly 56 may provide electrical power to various components of the work vehicle 10 and may also receive recharging power from components, such as the electric machine(s) 47, 49 for example. The battery assembly 56 may be considered to have a state of charge that represents the amount of electrical power that the battery assembly 56 is capable of providing at a particular time. The state of charge may be impacted by a number of factors, including battery usage and temperature. Typically, the battery assembly 56 is recharged upon operation of the engine 42. At a given time, the state of charge may be measured or otherwise determined by a battery sensor 60 that provides appropriate signals to the controller 32 of control system 40. The battery assembly 56 may be controlled by the controller 32 based on commands from the operator via the human-vehicle interface 34 and/or based on readings acquired by battery sensor 60.

The work vehicle 10 also includes additional braking and retardation components that, upon actuation/activation, operate to absorb and dissipate energy to slow the work vehicle 10. As examples, the work vehicle may include axle service brakes 64 and an engine brake 66 (e.g., exhaust brake, Jake brake) that may be employed to slow movement of the work vehicle 10. A brake resistor 68 (and associated chopper 69) may also be provided in the work vehicle 10 to provide retardation, where the chopper 69 is closed to switch braking energy to the brake resistor 68, with the brake resistor 68 functioning to convert braking energy to heat to thereby dissipate energy and slow movement of the work vehicle 10. The braking and retardation components indicated above may be actuated by a command from the controller 32, for example, based on inputs received from the human-vehicle interface 34, and from various sensors in the work vehicle 10. In one example, the axle service brakes 64, engine brake 66, and/or brake resistor 68 may be activated by a braking torque command from the controller 32. One or more brake sensors 70 may be provided to collect information associated with the axle service brakes 64, such as the temperature of the axle service brakes 64.

The work vehicle 10 may further include other components that may draw power on the vehicle. These components may include vehicle cooling fans 72 and engine accessories such as an alternator and HVAC compressor, which are generally indicated at 74, as non-limiting examples. The vehicle cooling fans 72 and engine accessories 74 may be operated based on signals from the controller 32 and/or control system 40.

Additional sensors may be provided to observe various conditions associated with the work vehicle 10. For example, cooling fan sensors 76 may be disposed on or near the vehicle cooling fans 72 to measure operational parameters thereof, such as cooling fan speed. In addition, various sensors 78 may be utilized to monitor the condition of the engine accessories 74 described above. Still further, the work vehicle 10 may include one or more voltage sensors 80 that measure current on a DC bus (i.e., an inverter DC bus voltage) of the work vehicle 10.

According to the various components and features of the work vehicle 10 as described above, a multi-level braking and retardation scheme may be implemented in the work vehicle 10. The control system 40 may operate to selectively store and dissipate energy that is generated by motion of the work vehicle 10 during operation thereof, especially during slowing of the vehicle and/or when the vehicle is descending a steep grade. Energy is allocated between a number of energy storage, braking, and retardation components in the work vehicle (described above) according to a hierarchal or prioritized energy allocation scheme implemented by controller 32 to maximize use of this energy and minimize component wear that might result from braking and retardation actions. The braking and retardation is achieved in the work vehicle without use of a fluid retarder, but with the control system 40 instead allocating energy from the work vehicle amongst a number energy absorbing components in a braking and retardation system 82—with the braking and retardation system 82 characterized as including various energy storage, braking, and retardation components that include the battery assembly 56, brake resistor 68, engine brake 66, axle service brakes 64, vehicle cooling fan(s) 72, engine accessories 74 (alternator, HVAC compressor, etc.), transmission braking via the transmission 44, and/or engine friction within the engine 42. The multi-level braking and retardation scheme may be employed by the control system 40 responsive to a braking torque command requested by the operator to slow movement of the work vehicle 10, with the control system 40 selectively allocating energy to the various absorbing components in the work vehicle.

Figure 2:
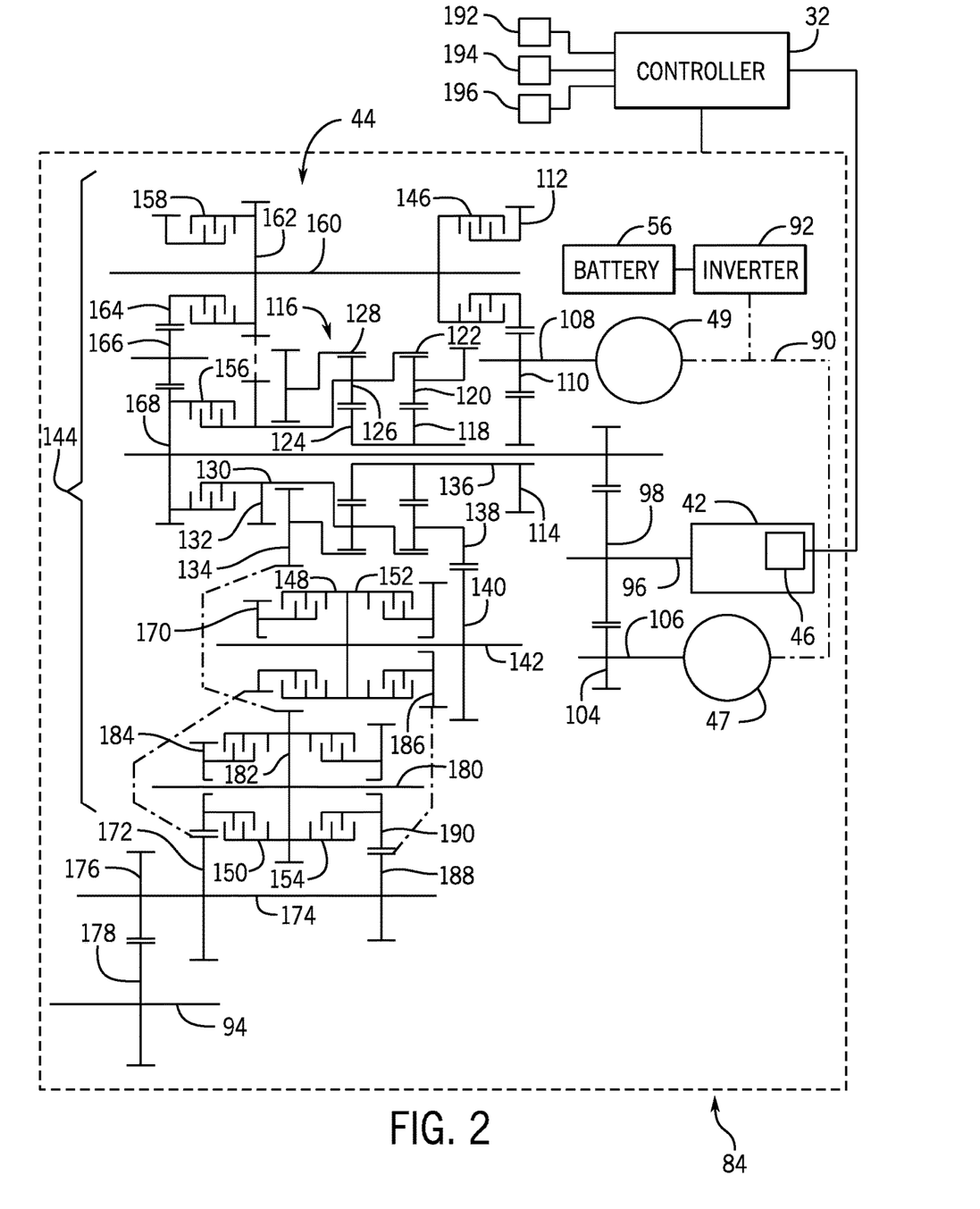
FIG. 2 is a schematic diagram of a hybrid electric drive train of the work vehicle of FIG. 1, including an example infinitely variable transmission therein.

Referring to FIG. 2, an example of a hybrid electric drive system or drive train 84 included in the work vehicle 10 is illustrated that provides a more detailed discussion of the structure and arrangement of the engine 42, electric machines 47, 49, and transmission 44 of the work vehicle 10 and how the transmission 44 may be operated to provide transmission braking to dissipate energy as part of the multi-level braking and retardation scheme implemented by the control system 40 to dissipate vehicle energy during a dynamic event, such as when the work vehicle 10 is traveling down a grade to slow the engine of the vehicle at the desired rate. According to the disclosure below, the transmission 44 is operable to bring on a "4-squaring" clutch to dissipate energy in the work vehicle 10, with the energy being consumed with existing transmission hardware. Operation of the transmission 44 and overall drive train 84 to provide transmission clutch braking is more fully disclosed in United States Publication No. US 2020/0309258, which is commonly owned by the assignee of the present application and incorporated herein by reference. It is recognized, however, that the drive train 84 illustrated in FIG. 2 and described here below is merely an example and that transmission braking may be provided by a transmission having a different arrangement or construction and that the specific transmission 44 described below does not limit embodiments of the invention in this regard.

In the illustrated embodiment, the drive train 84 includes the engine 42, the first electric machine 47, and the second electric machine 49. The first electric machine 47 and second electric machine 49 may be connected by an electrical conduit 90. A power inverter 92 may be included and may be operably connected to the first electric machine 47 and/or the second electric machine 49. In some embodiments, the power inverter 92 may feed energy to and/or receive energy from the battery assembly 56. Also, the power inverter 92 may feed energy to and/or receive energy from the drive train 84. Moreover, in some embodiments, the power inverter 92 may off-board power to an implement and/or another energy off-boarding device (not shown).

The transmission 44 transfers power from the engine 42, first electric machine 47, and/or second electric machine 49 to an output shaft 94. As described below, the transmission 44 includes a number of gearing, clutch, and control assemblies to suitably drive the output shaft 94 at different speeds in multiple directions. Generally, in one example, the transmission 44 of drive train 84 may be any type of electric infinitely variable transmission arrangement (eIVT), with it recognized that alternatives to the transmission illustrated in FIG. 2 may be included in the drive train 84.

The engine 42 may provide rotational power via an engine output element, such as a flywheel, to an engine shaft 96 according to commands from the controller 32 based on the desired operation. The shaft 96 may be configured to provide rotational power to a gear 98. The gear 98 may be enmeshed with a gear 100, which may be supported on (e.g., fixed to) a shaft 102. The shaft 102 may be substantially parallel to and spaced apart from the engine shaft 96. The shaft 102 may support various components of the drive train 84 as will be discussed in detail.

The gear 98 may also be enmeshed with a gear 104, which is supported on (e.g., fixed to) a shaft 106. The shaft 106 may be substantially parallel to and spaced apart from the engine shaft 96, and the shaft 106 may be connected to the first electric machine 47. Accordingly, mechanical power from the engine (i.e., engine power) may transfer via the engine shaft 96, to the enmeshed gears 98, 104, to the shaft 106, and to the first electric machine 47. The first electric machine 47 may convert this power to electrical power for transmission over the conduit 90 to the second electric machine 49. This converted and transmitted power may then be re-converted by the second electric machine 49 for mechanical output along a shaft 108. Various known control devices (not shown) may be provided to regulate such conversion, transmission, re-conversion, and so on. Also, in some embodiments, the shaft 108 may support a gear 110 (or other similar component). The gear 110 may be enmeshed with and may transfer power to a gear 112. The gear 110 may also be enmeshed with and may transfer power to a gear 114. Accordingly, power from the second electric machine 49 (i.e., CVP power) may be divided between the gear 112 and the gear 114 for transmission to other components as will be discussed in more detail below.

The drive train 84 may further include a variator 116 that represents one example of an arrangement that enables an infinitely variable power transmission between the engine 42 and electric machines 47, 49 and the output shaft 94. As discussed below, this arrangement further enables transmission 44 to perform transmission clutch braking in which excess energy is dissipated by a combination of transferring at least a portion of the energy back to the engine 42 and a portion to clutch braking. However, other arrangements of the variator 116, engine 42, and electric machines 47, 49 may be provided.

In some embodiments, the variator 116 may include at least two planetary gearsets. In some embodiments, the planetary gearset may be interconnected and supported on a common shaft, such as the shaft 102, and the planetary gearsets may be substantially concentric. In other embodiments, the different planetary gearsets may be supported on separate, respective shafts that are nonconcentric. The arrangement of the planetary gearsets may be configured according to the available space within the vehicle 10 for packaging the drive train 84.

As shown in the embodiment of FIG. 2, the variator 116 may include a first planetary gearset (i.e., a "low" planetary gearset) with a first sun gear 118, first planet gears and associated carrier 120, and a first ring gear 122. Moreover, the variator 116 may include a second planetary gearset (i.e., a "high" planetary gearset) with a second sun gear 124, second planet gears and associated carrier 126, and a second ring gear 128. The second planet gears and carrier 126 may be directly attached to the first ring gear 122. Also, the second planet gears and carrier 126 may be directly attached to a shaft 130 having a gear 132 fixed thereon. Moreover, the second ring gear 128 may be directly attached to a gear 134. As shown, the shaft 130, the gear 132, and the gear 134 may each receive and may be substantially concentric to the shaft 102. Although not specifically shown, it will be appreciated that the drive train 84 may include various bearings for supporting these components concentrically. Specifically, the shaft 130 may be rotationally attached via a bearing to the shaft 102, and the gear 134 may be rotationally attached via another bearing on the shaft 130.

On the opposite side of the variator 116 (from left to right in FIG. 2), the gear 114 may be mounted (e.g., fixed) on a shaft 136, which also supports the first and second sun gears 118, 124. In some embodiments, the shaft 136 may be hollow and may receive the shaft 102. A bearing (not shown) may rotationally support the shaft 136 on the shaft 102 substantially concentrically.

Furthermore, the first planet gears and associated carrier 120 may be attached to a gear 138. The gear 138 may be enmeshed with a gear 140, which is fixed to a shaft 142. The shaft 142 may be substantially parallel to and spaced apart from the shaft 102.

As noted above, the drive train 84 may be configured for delivering power (from the engine 42, the first electric machine 47, and/or the second electric machine 49) to the output shaft 94 via the transmission 44. The output shaft 94 may be configured to transmit this received power to wheels of the vehicle 10.

The drive train 84 may have a plurality of selectable modes, such as a direct drive mode, a split path mode, and a series mode. In the direct drive mode, power from the engine 42 may be transmitted to the output shaft 94, and power from the second electric machine 49 may be prevented from transferring to the output shaft 94. In the split path mode, power from the engine 42 and the second electric machine 49 may be summed by the variator 116, and the summed or combined power may be delivered to the output shaft 94. Moreover, in the series mode, power from the second electric machine 49 may be transmitted to the output shaft 94 and power from the engine 42 may be prevented from transferring to the output shaft 94. The drive train 84 may also have different speed modes in one more of the direct drive, split path, and series modes, and these different speed modes may provide different angular speed ranges for the output shaft 94. The drive train 84 may switch between the plurality of modes to maintain suitable operating efficiency. Furthermore, the drive train 84 may have one or more forward modes for moving the vehicle 10 in a forward direction one or more reverse modes for moving the vehicle 10 in a reverse direction.

The drive train 84 may switch between the different modes, for example, using a control assembly 144. The control assembly 144 may include one or more selectable transmission components. The selectable transmission components may have first positions (engaged positions), in which the respective device transmits power from an input component to an output component. The selectable transmission components may also have a second position (a disengaged position), in which the device prevents power transmission from the input to the output component. The selectable transmission components of the control assembly 144 may include one or more wet clutches, dry clutches, dog collar clutches, brakes, synchronizers, or other similar devices. The control assembly 144 may also include an actuator for actuating the selectable transmission components between the first and second positions.

As shown in FIG. 2, the control assembly 144 may include a first clutch 146, a second clutch 148, a third clutch 150, a fourth clutch 152, and a fifth clutch 154. Also, the control assembly 144 may include a forward directional clutch 156 and a reverse directional clutch 158. In some embodiments, the first clutch 146 may be mounted and supported on a shaft 160. Also, the first clutch 146, in an engaged position, may engage the gear 112 with the shaft 160 for rotation as a unit. The first clutch 146, in a disengaged position, may allow the gear 112 to rotate relative to the shaft 160. Also, a gear 162 may be fixed to the shaft 160, and the gear 162 may be enmeshed with the gear 132 that is fixed to the shaft 130. The reverse directional clutch 158 may be supported on the shaft 160 (i.e., commonly supported on the shaft 160 with the first clutch 146). The reverse directional clutch 158 may engage and, alternatively, disengage the gear 162 and a gear 164. The gear 164 may be enmeshed with an idler gear 166, and the idler gear 166 may be enmeshed with a gear 168. The forward directional clutch 156 may be supported on gear 168, which is in turn supported on the shaft 102, to selectively engage shaft 130. Thus, the forward directional clutch 156 may be concentric with both the shaft 130 and the shaft 102. The second clutch 148 may be supported on the shaft 142. The second clutch 148 may engage and, alternatively, disengage the shaft 142 and a gear 170. The gear 170 may be enmeshed with a gear 172. The gear 172 may be fixed to and mounted on a countershaft 174. The countershaft 174 may also support a gear 176. The gear 176 may be enmeshed with a gear 178, which is fixed to the output shaft 94.

The third clutch 150 may be supported on a shaft 180. The shaft 180 may be substantially parallel and spaced at a distance from the shaft 142. Also, a gear 182 may be fixed to and supported by the shaft 180. The gear 182 may be enmeshed with the gear 134 as shown. The third clutch 150 may engage and, alternatively, disengage the gear 182 and a gear 184. The gear 184 may be enmeshed with the gear 172. The fourth clutch 152 may be supported on the shaft 142 (in common with the second clutch 148). The fourth clutch 152 may engage and, alternatively, disengage the shaft 142 and a gear 186. The gear 186 may be enmeshed with a gear 188, which is mounted on and fixed to the countershaft 174. Additionally, the fifth clutch 154 may be supported on the shaft 180 (in common with and concentric with the third clutch 150). The fifth clutch 154 may engage and, alternatively, disengage the shaft 180 and a gear 190. The gear 190 may be enmeshed with the gear 188.

As indicated previously, the drive train 84 is operable in a number of modes based on selective operation of the transmission, including at least one split-path mode in which power from the engine 42 and one or more of the electric machines 47, 49 are combined, a direct drive mode where power is provided only from the engine 42, and a series mode where power is provided only from the electric machines 47, 49. As introduced above, the controller 32 is coupled to the control assembly 144 for controlling one or more actuators and, as a result, controlling movement of the one or more selective transmission components within the transmission 44, including the first clutch 146, the second clutch 148, the third clutch 150, the fourth clutch 152, the fifth clutch 154, the forward directional clutch 156 and the reverse directional clutch 158. Generally, the controller 32 operates the control assembly 144, as well as the engine 42 and electric machines 47, 49, to implement the desired function, e.g., to achieve the requested torque at the output shaft 94 for overall control of the work vehicle 10. This includes vehicle accelerations, stops, starts, shifting between gear ratios, shifting between directions, and the like.

The transmission 44 may also provide transmission braking (transmission clutch braking) during aspects of operation in situations in which it is desirable to dissipate energy of the work vehicle 10. The transmission braking may particularly be utilized during a dynamic event, such as when the work vehicle 10 is descending a steep grade and therefore subject to excess energy, and transmission braking is desired to apply a negative torque in order to maintain or reduce vehicle speed that may result in the excess energy at the engine. As described in greater detail below, the transmission braking enables at least a portion of this energy to be applied via the directional clutches 156, 158 of the transmission 44 to backdrive the engine 42 at the flywheel such that internal loses (e.g., heat and friction) may dissipate at least a portion of the excess energy. However, if this energy results in the engine 42 otherwise exceeding a predetermined speed threshold, the controller 32 may command the engagement of the opposite directional clutch 158, 156 to further dissipate this energy via friction and heat losses at the directional clutch 158, 156. In effect, a form of a "4-squaring" clutch arrangement may be selectively implemented based on the engine speed to further slow the engine output shaft. This combination of engine backdriving and opposite directional clutch engagement may achieve sufficient energy dissipation without utilizing output-side clutch braking and/or in a manner that is independent of wheel braking.

During a dynamic event, such as when the work vehicle 10 is descending a grade and the drive train 84 is placed in the forward directional modes or the direct drive modes as described above, power from the engine 42 is transferred from the engine shaft 96 through the forward directional clutch 156 and ultimately transferred to the output shaft 94 through the described arrangement. Therefore, when the reverse directional clutch 158 is engaged during the engagement of the forward directional clutch 156 in these modes, application of the reverse directional clutch 158 operates to apply an opposing torque to slow down the engine shaft 96. In other words, the reverse directional clutch 158 acts as a clutch brake within the drive train 84 on the engine shaft 96. In one example, the reverse directional clutch 158 functions as a clutch brake in these modes since gear 164, on one side of the reverse directional clutch 158 is moving in an opposite direction as gear 162, on the other side of the reverse directional clutch 158, and engagement of the clutch elements of the reverse directional clutch 158 creates a frictional drag on the rotations, which in turn, is transferred through the shaft 102 to the shaft 96 at the engine 42.

The controller 32 is used to selectively control actuation of the forward directional clutch 156 and the reverse directional clutch 158 during the different directional modes of the work vehicle to provide the transmission breaking. The controller 32 may generate commands for implementing the transmission braking based on inputs from engine speed sensor 46 and from a number of additional transmission sensors 192, 194, 196. Sensor 192 is operatively associated with the input device 36 to receive selection of a gear or operating mode therefrom, while sensor 194 is operatively associated with the forward directional clutch 156 to identify an engagement status thereof and sensor 196 is operatively associated with the reverse directional clutch 158 to identify an engagement status thereof.

Figure 3:
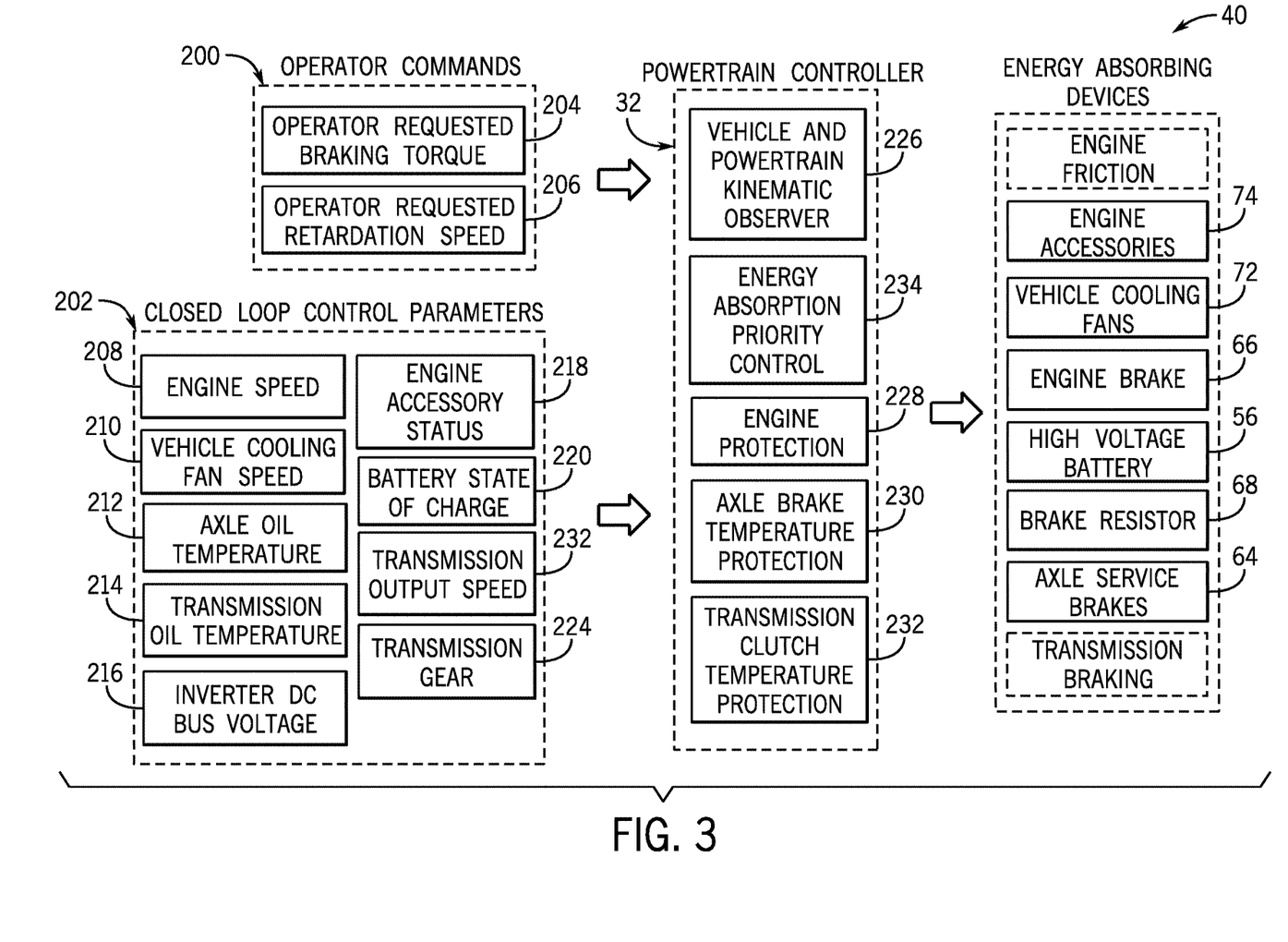
FIG. 3 is a block diagram of inputs to, and components of, a control system that provides multi-layer braking and retardation for the work vehicle of FIG. 1.

Referring now to FIG. 3, a block diagram illustrates operation of the control system 40 in implementing a multi-level braking and retardation scheme in the work vehicle 10, including an illustration of inputs to, and components of, the control system 40. Embodiments of the control system 40 according to the present disclosure can include a variety of inputs to the controller 32, a variety of sub-modules or algorithms within the controller 32, and activation of a variety of energy absorbing components within the work vehicle 10.

Inputs provided to the controller 32 can generally be divided into operator commands 200 and closed-loop control parameters 202. The operator commands 200 may be provided to the controller 32 by way of the human-vehicle interface 34 and input device 36 on the work vehicle 10, for example. The operator commands 200 provided to the controller 32 may include an operator requested braking torque 204 and associated operator requested retardation speed 206. The operator provides a command to the controller 32 on an amount of braking torque and retardation that is desired to slow the work vehicle 10 and/or maintain vehicle speed as the work vehicle 10 travels down a grade.

The closed-loop control parameters 202 may be provided to the controller 32 via the use of the various sensors 46, 48, 54, 60, 70, 76, 78, 80, 192, 194, 196 included in the work vehicle, as described above with respect to FIG. 1, with the sensors acquiring readings or measurements on various operational parameters of the work vehicle 10 during operation thereof. The control parameters 202 may include, but are not limited to, engine speed 208, vehicle cooling fan speed 210, axle oil temperature 212, transmission oil temperature 214, inverter DC bus voltage 216, engine accessory status 218, battery state of charge 220, transmission output speed 222, and transmission gear 224. The control parameters 202 are thus indicative of the present state of the vehicle drive train 84 and the various energy absorbing components in the work vehicle 10, with the controller 32 analyzing the control parameters 202 to determine an optimal manner in which to allocate energy amongst those energy absorbing components in the braking and retardation system 82.

As illustrated in FIG. 3, the controller 32 may include a number of sub-modules or algorithms therein by which the controller 32 determines an optimal manner in which to allocate energy amongst components in the braking and retardation system 82 of the work vehicle 10. Controller 32 includes a sub-module 226 that functions as a vehicle and drive train kinematic observer, with the sub-module 226 observing operation of the transmission 44 responsive to torque commands from the operator, including a speed of the output shaft 94 for example. Closed-loop control parameter inputs on the engine speed 208, transmission gear 224, and transmission output speed 222 may be provided to the sub-module 226, for example.

Controller 32 also includes an engine protection sub-module 228 that functions to identify the current operational status of the engine 42 and provide proper braking and retardation in the work vehicle 10 to provide protection to the engine. Closed-loop control parameter inputs on the engine speed 208 may be provided to the engine protection sub-module 228 to monitor the current operating speed of the engine 42. The engine protection sub-module 228 may then control the engine speed by selectively dissipating energy via desired components in the braking and retardation system 82 of the work vehicle 10 to prevent an engine overspeed condition from occurring.

Controller 32 also includes an axle brake protection sub-module 230 that functions to monitor the temperature of the axle service brakes 64 and provide a proper operational control scheme for the axle service brakes 64 to provide protection thereto. Closed-loop control parameter inputs on the axle oil temperature 212 and/or other aspects of the axle service brakes 64 may be provided to the axle brake protection sub-module 230 to monitor the temperature of the axle. The axle brake protection sub-module 230 may then prevent over-heating of the axle service brakes 64 and otherwise provide protection thereto by selectively dissipating energy via desired components in the braking and retardation system 82 (other than the axle service brakes 64) of the work vehicle 10.

Controller 32 also includes a transmission clutch protection sub-module 232 that functions to monitor the temperature of the transmission clutches 156, 158 and provide a proper operational control scheme for the transmission 44 to provide protection thereto. Closed-loop control parameter inputs on the transmission oil temperature 214 and/or other aspects of the transmission 44 may be provided to the transmission clutch protection sub-module 232 to monitor the temperature of the transmission clutches 156, 158. The transmission clutch protection sub-module 232 may then prevent over-heating of the transmission clutches 156, 158 and otherwise provide protection thereto by selectively dissipating energy via desired components in the braking and retardation system 82 (other than the transmission 44) of the work vehicle 10.

Controller 32 also includes a sub-module 234 that functions as an energy absorption priority control, i.e., a priority control sub-module 234. That is, the priority control sub-module 234 functions to determine a hierarchy according to which to allocate or divide energy generated by the work vehicle 10 amongst components in the braking and retardation system 82. In determining a hierarchal energy allocation scheme, the priority control sub-module 234 receives various closed-loop control parameters 202 (as measured by associated sensors) and operator commands 200 and communicates with other sub-modules in the controller 32. The priority control sub-module 234 evaluates these inputs and communications and identifies an energy allocation amongst components in the braking and retardation system 82 that will sufficiently absorb the vehicular energy and do so in a manner that optimizes energy capture/storage and minimizes usage of wear components in the braking and retardation system 82. The priority control sub-module 234 outputs commands to the various components in the braking and retardation system 82 to direct energy thereto or otherwise actuate the components to absorb energy.

Figure 4:
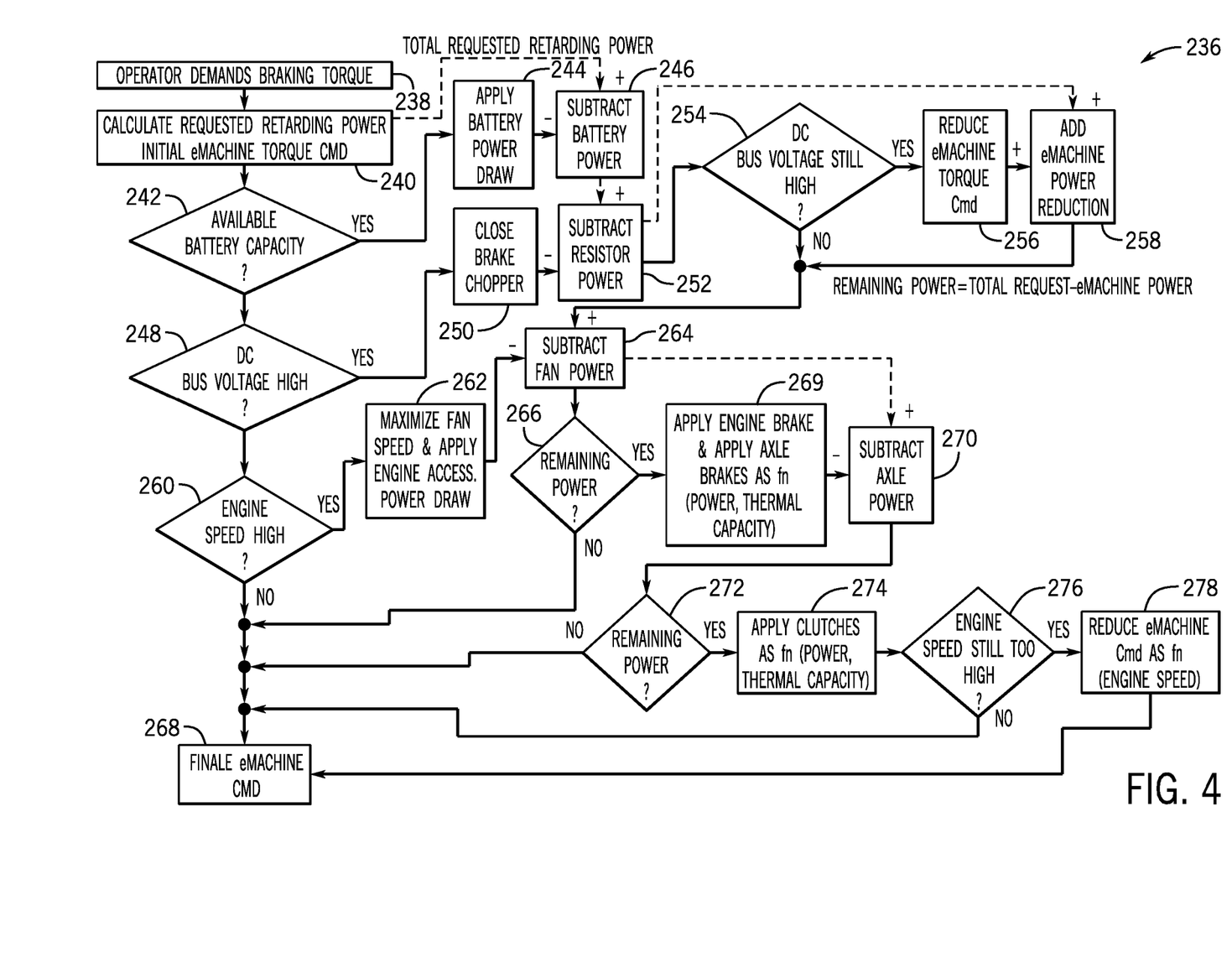
FIG. 4 is a flowchart of a control scheme for providing multi-layer braking and retardation in a work vehicle.

Referring now to FIG. 4, a flowchart of a method 236 for providing multi-layer braking and retardation in the work vehicle 10 is provided in accordance with the present disclosure, such as may be performed by the controller 32. Generally, the method 236 is implemented during operation of the work vehicle 10 when braking or retardation is required, e.g., during forward propulsion of the vehicle down a steep grade. As will be explained in detail below, the method 236 implements a hierarchal energy allocation scheme for allocating energy when performing braking and retardation in the work vehicle 10, with energy first being allocated to energy storage devices in the work vehicle 10 and then being allocated to other energy consuming accessories and non-wear components on the work vehicle 10, before wear components are employed to dissipate remaining energy. The method 236 provides an example of a hierarchal energy allocation scheme that may be implemented, but it is recognized that other similar hierarchal energy allocation schemes may be implemented to provide multi-layer braking and retardation in a work vehicle 10 where a different hierarchy may be provided and/or where some different combination of energy absorbing components in the work vehicle 10 are utilized.

The method 236 begins at step 238 with the operator demanding a braking torque for the work vehicle 10 to slow the movement thereof. The braking torque that is demanded may be a function of the speed at which the work vehicle 10 is traveling, a weight of the vehicle (i.e., of a payload being carried by the vehicle), and/or a degree of the grade that the vehicle is traveling down, as these parameters will at least in part determine the amount of braking torque that will be necessary.

Responsive to the demanded braking torque, the controller 32, at step 240, calculates an amount of retarding power or energy that must be requested from various energy absorbing components in the work vehicle 10 to meet the demanded braking torque, i.e., an amount of energy that must be absorbed in/by the work vehicle 10 to meet the braking torque demand. Also at step 240, and in connection with calculating the requested amount of retarding power, the controller 32 also sets an initial torque command for the electric machine(s) 47, 49 included in the work vehicle 10 to control operation of the electric machine(s) 47, 49 while braking and retardation is occurring in the work vehicle 10. The initial torque command provided to the electric machine(s) 47, 49 functions to control the amount of power provided back to the DC bus in the work vehicle 10 during braking and retardation.

In the illustrated example, the method 236 continues next to step 242 where a determination is made as to whether any available charging capacity is present in the battery assembly 56. The controller 32 may receive inputs from the battery sensor 60 regarding a state of charge of the battery assembly 56 in determining whether any charging capacity is available in the battery assembly 56. If it is determined that charging capacity is available in the battery assembly 56, then the method 236 continues to step 244, where a battery power draw is performed. At step 246, the amount of power drawn by the battery assembly 56 is subtracted from the total requested retarding power calculated previously at step 240, to output an amount of remaining retarding power that must still be absorbed by the braking and retardation system 82 in the work vehicle 10, with this value being stored by the controller 32 as the method 236 continues.

As a potential power draw from the battery assembly 56 is occurring, the method 236 continues along a parallel track with a determination being made at step 248 regarding whether a voltage on the DC bus 58 is at a high level—with a high level of DC bus voltage being considered as energy present that requires further absorption or retarding by the control system 40. The controller 32 may receive inputs from the voltage sensor 80 on the level of the DC bus voltage in performing step 248, with the measured DC bus voltage being compared to a pre-determined DC bus voltage threshold, for example, to determine if the DC bus voltage is at a high level. If it is determined that the voltage on the DC bus 58 is at a high level, further power is dissipated from the DC bus 58 via operation of the brake resistor 68 (and brake chopper). That is, the brake chopper is first closed at step 250, with closing of the brake chopper causing power to be subsequently provided to the brake resistor 68 at step 252. At step 252, the amount of power consumed by the battery assembly 56 is subtracted from the (remaining) retarding power to be absorbed that was calculated previously at step 246, to output a modified amount of remaining retarding power that must still be absorbed by the braking and retardation system 82 in the work vehicle 10, with this modified value being stored by the controller 32 as the method 236 continues.

After the power consumption provided by the brake resistor 68 at step 252, the method 236 continues at step 254 with another determination of whether the voltage on the DC bus 58 is still at a high level. Again, the controller 32 may receive inputs from the voltage sensor 80 on the level of the DC bus voltage in performing step 254. If it is determined at step 254 that the voltage on the DC bus 58 is still at a high level, the controller 32 may function to issue a back-off command, whereby the requested braking torque for the work vehicle 10 is reduced via modifying the initial torque command provided to the electric machine(s) 47, 49. The back-off command functions to lessen the amount of power that must be absorbed in the work vehicle 10 by reducing the amount of power provided to the DC bus 58 during retarding of the work vehicle 10. Accordingly, a reduced torque command is provided to the electric machine(s) 47, 49 at step 256 and, at step 258, the power reduction associated with the reduced torque command is quantified and subtracted out from the (remaining) retarding power calculated previously at step 252, to output a modified amount of remaining retarding power that must still be absorbed by the braking and retardation system 82 in the work vehicle 10, with this modified value being stored by the controller 32 as the method 236 continues.

While the DC voltage is being monitored at step 254, and potentially modified via a power reduction at steps 256, 258, the method 236 continues along a parallel track with a determination being made at step 260 regarding whether the speed of the engine 42 is at a high level—with a high level of engine speed being considered as a speed that could be characterized as an overspeed condition or approaching an overspeed condition. The controller 32 may receive inputs from the engine speed sensor 46 on the engine speed in performing step 260. If it is determined that the engine speed is at a high level, further power is dissipated via modifying operation of the vehicle cooling fan(s) 72 at step 262 and/or directing additional energy to one or more engine accessories 74 on the work vehicle 10. That is, the controller 32 may cause the vehicle cooling fan(s) 72 to operate at a maximum speed so as to consume additional power and/or cause the engine accessories 74 to draw additional power (e.g., HVAC compressor to draw increased power, to provide additional vehicle cooling). In performing step 262, the controller 32 may receive inputs from the sensors 76, 78 on the cooling fan speed and engine accessory status in determining an appropriate power draw for the vehicle cooling fan(s) 72, and engine accessories 74. At step 264, the amount of power consumed by the vehicle cooling fan(s) 72 and/or engine accessories 74 is subtracted from the (remaining) retarding power to be absorbed that was calculated previously at step 258, to output a modified amount of remaining retarding power that must still be absorbed by the braking and retardation system 82 in the work vehicle 10, with this modified value being stored by the controller 32 as the method 236 continues.

As the method 236 continues, a determination is made at step 266 regarding whether additional power must still be absorbed to meet the operator demanded braking power, i.e., whether the total requested retarding power has already been absorbed by energy absorbing components in the work vehicle 10.

If a determination is made at step 266 that there is no power remaining that requires further braking and retardation via the control system 40, then the method 236 continues to step 268, where the controller 32 provides a final command to the electric machine(s) 47, 49 to control operation thereof. Upon completion of step 268, the method 236 would be repeated in a subsequent program cycle in which the controller 32 would again check or receive the braking torque demand from the operator, calculate a requested retarding power for the braking torque demand, and progress through a hierarchal energy allocation scheme (steps 238-

266) to allocate energy absorption between the plurality of braking and retardation components in the work vehicle 10.

If a determination is made at step 266 that there is power remaining that requires further braking and retardation via the control system 40, then the method 236 continues to step 269, where one or more of the engine brake 66 (e.g., exhaust brake, Jake brake) and the axle service brakes 64 are actuated or applied. The engine brake 66 and axle service brakes 64 may be applied as a function of the power remaining to be retarded in the work vehicle 10 and, with particular regard to the axle service brakes 64, further as a function of the thermal capacity or temperature thereof (e.g., axle oil temperature, as measured by sensor 70). In one implementation, application of the engine brake 66 may be prioritized over the axle service brakes 64, as the engine brake 66 is recognized as a non-wear component that does not degrade responsive to increased use, as compared to the axle service brakes 64. At step 270, the amount of power dissipated by the engine brake 66 and/or axle service brakes 64 is subtracted from the (remaining) retarding power to be absorbed that was calculated previously at step 264, to output a modified amount of remaining retarding power that must still be absorbed by the braking and retardation system 82 in the work vehicle 10, with this modified value being stored by the controller 32 as the method 236 continues.

The method 236 continues to step 272, where another determination is made regarding whether additional power must still be absorbed to meet the operator demanded braking power, i.e., whether the total requested retarding power has already been absorbed by energy absorbing components in the work vehicle 10. If there is no power remaining that requires further braking and retardation via the control system 40, then the method 236 proceeds by performing step 268 as previously described. Conversely, if a determination is made at step 272 that there is power remaining that requires further braking and retardation via the control system 40, then the method 236 continues to step 274, where transmission braking may be performed via selective actuation of clutches 156, 158 in the transmission 44 as previously described with respect to FIG. 2. The transmission braking may be applied as a function of the power remaining to be retarded in the work vehicle 10 and as a function of the thermal capacity in the transmission (e.g., transmission oil temperature, as measured by sensor 48).

Upon performing any necessary transmission braking, the method 236 may make another determination at step 276 regarding whether the speed of the engine 42 is still at a high level—i.e., at or approaching an overspeed condition. The controller 32 may receive inputs from the sensor 46 on the engine speed in performing step 276. If the engine speed is at an acceptable level, then the method 236 proceeds by performing step 268 as previously described. Conversely, if it is determined that the engine speed is still at a high level, the controller 32 may function to issue another back-off command at step 278, whereby the requested braking torque for the work vehicle 10 is reduced via further modifying the torque command provided to the electric machine(s) 47, 49, thereby lessening the amount of power that must be absorbed in the work vehicle 10.

Upon further reducing the torque command provided to the electric machine(s) 47, 49 at step 278, as necessary, the method 236 proceeds to step 268, where the command as modified at step 278 is provided to the electric machine(s) 47, 49 as a final command. As previously described, upon completion of step 268, the method 236 would be repeated in a subsequent program cycle in which the controller 32 would again check or receive the braking torque demand from the operator, calculate a requested retarding power for the braking torque demand, and progress through a hierarchal energy allocation scheme (steps 238-268 or 238-278) to allocate energy absorption between the plurality of braking and retardation components in the work vehicle 10.

Accordingly, the present control system 40 provides an effective method for providing braking and retardation in the work vehicle 10 according to a hierarchal energy allocation scheme. In one example, the control system 40 may sequentially allocate energy to the battery assembly 56, brake resistor 68, vehicle cooling fans 72 (and engine accessories 74), engine brake 66, axle service brakes 64, and transmission clutches 156, 158 to store and dissipate excess energy in the work vehicle 10, such as when on a steep grade or carrying a heavy payload. Alone, and particularly in combination, these aspects of the control system 40 may negate the need for a fluid retarder in a work vehicle having a hybrid electric drive system and minimize the use of axle service brakes for slowing the work vehicle 10.

ENUMERATED EXAMPLES

The following examples are provided, which are numbered for ease of reference.

1. A control system for providing multi-layer braking and retardation in a work vehicle that includes a hybrid electric drive system having an engine and one or more electric machines is provided. The control system includes a braking and retardation system configured to dissipate energy generated by motion of the work vehicle, with the braking and retardation system further including a brake resistor, an engine brake, and a transmission operable to provide transmission braking. The control system also includes a controller, including a processor and memory architecture, that is operably connected to the hybrid electric drive system and the braking and retardation system. The controller is configured to receive a plurality of inputs comprising a braking torque demand from an operator and operational parameters of the hybrid electric drive system and the braking and retardation system, determine an amount of energy absorption necessary in the work vehicle to meet the braking torque demand, and allocate the energy to be absorbed within the braking and retardation system according to a hierarchal energy allocation scheme, with the energy allocated based on the determined amount of energy absorption and the operational parameters of the hybrid electric drive system and the braking and retardation system.

2. The control system of example 1, wherein the braking and retardation system further comprises an energy storage device that may be charged from the energy generated by motion of the work vehicle.

3. The control system of example 2, wherein in allocating the energy according to the hierarchal energy allocation scheme, the controller is configured to perform a first energy subtraction by supplying charging energy to the energy storage device and perform a second energy subtraction, after the first energy subtraction, by supplying energy to the brake resistor.

4. The control system of example 3, wherein the controller is configured to measure a voltage on a DC bus coupled to the brake resistor and the energy storage device after the first and second energy subtractions, determine if the voltage is above a DC bus voltage threshold, and when the voltage is above the DC bus voltage threshold, reduce a level of the braking torque demand.

5. The control system of claim 3, wherein the braking and retardation system further comprises axle service brakes and vehicle and engine accessories, the vehicle and engine accessories including one or more of an alternator, an HVAC compressor, and vehicle cooling fans.

6. The control system of example 5, wherein in allocating the energy according to the hierarchal energy allocation scheme, the controller is configured to perform a third energy subtraction, after the second energy subtraction, by supplying energy to the vehicle and engine accessories, and perform a fourth energy subtraction, after the third energy subtraction, by dissipating energy via actuation of the engine brake and the axle service brakes.

7. The control system of example 6, wherein in allocating the energy according to the hierarchal energy allocation scheme, the controller is configured to perform a fifth energy subtraction, after the fourth energy subtraction, by controlling the transmission to perform transmission braking.

8. The control system of example 7, wherein the transmission comprises an infinitely variable transmission configured to selectively transfer power from one or both of the engine and the one or more electric machines to an output shaft, and wherein the infinitely variable transmission performs the transmission braking by selectively engaging a plurality of clutches in the infinitely variable transmission.

9. The control system of example 3, wherein the controller is configured to determine if the energy storage device has any available charging capacity, perform the first energy subtraction by providing charging energy to the energy storage device when there is available charging capacity, and skip the first energy subtraction if there is no available charging capacity.

10. The control system of example 2, wherein the operational parameters comprise at least some of engine speed, axle oil temperature, transmission oil temperature, DC bus voltage, energy storage device state of charge, transmission output speed, transmission gear, engine accessory status, and cooling fan speed.

11. The control system of example 1, wherein allocation of the energy to be absorbed according to the hierarchal energy allocation scheme provides overspeed protection to the engine.

12. The control system of example 1, wherein the hierarchal energy allocation scheme is an iterative control scheme, with a plurality of program cycles being performed by the controller.

13. A work vehicle includes a drive train including an engine, one or more electric machines, and a transmission to selectively transfer power from at least one of the engine and the one or more electric machines to an output shaft. The work vehicle also includes a braking and retardation system configured to dissipate energy generated by motion of the work vehicle, with the braking and retardation system having a brake resistor, an engine brake, and transmission braking provided by the transmission. The work vehicle further includes a controller, including a processor and memory architecture, in communication with the drive train and the braking and retardation system. The controller is configured to receive a plurality of inputs comprising a braking torque demand and operational parameters of the drive train and the braking and retardation system, determine an amount of energy absorption necessary in the work vehicle to meet the braking torque demand, and allocate the energy to be absorbed within the braking and retardation system according to a hierarchal energy allocation scheme, with the energy allocated based on the determined amount of energy absorption and the operational parameters of the drive train and the braking and retardation system.

14. The work vehicle of example 13, wherein the braking and retardation system further comprises an energy storage device configured to draw power as part of the hierarchal energy allocation scheme.

15. The work vehicle of example 14, wherein in allocating the energy according to the hierarchal energy allocation scheme, the controller is configured to assign a highest priority to storing energy and a next highest priority to engaging non-wear components of the braking and retardation system to dissipate energy.

CONCLUSION

The foregoing has thus provided a control system for providing multi-layer braking and retardation in a work vehicle that includes a hybrid electric drive system. The control system implements a hierarchal energy allocation scheme to selectively store and dissipate energy generated by motion of the work vehicle, with the control system allocating energy between a number of energy storage, braking, and retardation components in the work vehicle. The hierarchal energy allocation scheme prioritizes division of the energy amongst the energy storage, braking, and retardation components to maximize use of this energy and minimize component wear that might result from braking and retardation actions. The braking and retardation is achieved in the work vehicle without use of a fluid retarder, but with the control system instead allocating energy from the work vehicle amongst a number of energy absorbing components that may include a battery assembly, brake resistor, engine brake, axle service brakes, cooling fans, and other engine accessories, while also dissipating energy via engine friction and transmission braking.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for providing multi-layer braking and retardation in a work vehicle that includes a hybrid electric drive system having an engine and one or more electric machines, the control system comprising:
   a braking and retardation system configured to dissipate energy generated by motion of the work vehicle, the braking and retardation system comprising a brake resistor, an engine brake, and a transmission operable to provide transmission braking; and a controller, including a processor and memory architecture, operably connected to the hybrid electric drive system and the braking and retardation system, the controller configured to:
- receive a plurality of inputs comprising a braking torque demand from an operator and operational parameters of the hybrid electric drive system and the braking and retardation system;
- determine an amount of energy absorption necessary in the work vehicle to meet the braking torque demand; and
- allocate the energy to be absorbed within the braking and retardation system according to a hierarchal energy allocation scheme, with the energy allocated based on the determined amount of energy absorption and the operational parameters of the hybrid electric drive system and the braking and retardation system.

2. The control system of claim 1, wherein the braking and retardation system further comprises an energy storage device that may be charged from the energy generated by motion of the work vehicle.

3. The control system of claim 2, wherein in allocating the energy according to the hierarchal energy allocation scheme, the controller is configured to:
- perform a first energy subtraction by supplying charging energy to the energy storage device; and
- perform a second energy subtraction, after the first energy subtraction, by supplying energy to the brake resistor.

4. The control system of claim 3, wherein the controller is configured to:
- measure a voltage on a DC bus in the work vehicle after the first and second energy subtractions, the DC bus electrically coupled to the brake resistor and the energy storage device;
- determine if the voltage is above a DC bus voltage threshold; and
  - when the voltage is above the DC bus voltage threshold, reduce a level of the braking torque demand.

5. The control system of claim 3, wherein the braking and retardation system further comprises axle service brakes and engine accessories, the engine accessories including one or more of an alternator, an HVAC compressor, and vehicle cooling fans.

6. The control system of claim 5, wherein in allocating the energy according to the hierarchal energy allocation scheme, the controller is configured to:
- perform a third energy subtraction, after the second energy subtraction, by supplying energy to the engine accessories; and
- perform a fourth energy subtraction, after the third energy subtraction, by dissipating energy via actuation of the engine brake and the axle service brakes.

7. The control system of claim 6, wherein in allocating the energy according to the hierarchal energy allocation scheme, the controller is configured to perform a fifth energy subtraction, after the fourth energy subtraction, by controlling the transmission to perform transmission braking.

8. The control system of claim 7, wherein the transmission comprises an infinitely variable transmission configured to selectively transfer power from one or both of the engine and the one or more electric machines to an output shaft, and wherein the infinitely variable transmission performs the transmission braking by selectively engaging a plurality of clutches in the infinitely variable transmission.

9. The control system of claim 3, wherein the controller is configured to:
- determine if the energy storage device has any available charging capacity;
- perform the first energy subtraction by providing charging energy to the energy storage device when there is available charging capacity; and
- skip the first energy subtraction if there is no available charging capacity.

10. The control system of claim 2, wherein the operational parameters comprise at least some of engine speed, axle oil temperature, transmission oil temperature, DC bus voltage, energy storage device state of charge, transmission output speed, transmission gear, engine accessory status, and cooling fan speed.

11. The control system of claim 1, wherein allocation of the energy to be absorbed according to the hierarchal energy allocation scheme provides overspeed protection to the engine.

12. The control system of claim 1, wherein the hierarchal energy allocation scheme is an iterative control scheme, with a plurality of program cycles being performed by the controller.

13. A work vehicle comprising:
- a drive train including an engine, one or more electric machines, and a transmission to selectively transfer power from at least one of the engine and the one or more electric machines to an output shaft; and
- a braking and retardation system configured to dissipate energy generated by motion of the work vehicle, the braking and retardation system comprising a brake resistor, an engine brake, and transmission braking provided by the transmission; and
- a controller, including a processor and memory architecture, in communication with the drive train and the braking and retardation system, the controller configured to:
  - receive a plurality of inputs comprising a braking torque demand and operational parameters of the drive train and the braking and retardation system;
  - determine an amount of energy absorption necessary in the work vehicle to meet the braking torque demand; and
  - allocate the energy to be absorbed within the braking and retardation system according to a hierarchal energy allocation scheme, with the energy allocated based on the determined amount of energy absorption and the operational parameters of the drive train and the braking and retardation system.

14. The work vehicle of claim 13, wherein the controller is configured to:
- monitor a speed of the engine; and
- allocate the energy to be absorbed according to the hierarchal energy allocation scheme and further based on the speed of the engine, to provide overspeed protection to the engine.

15. The work vehicle of claim 13, wherein the braking and retardation system further comprises an energy storage device configured to draw power as part of the hierarchal energy allocation scheme.

16. The work vehicle of claim 15, wherein in allocating the energy according to the hierarchal energy allocation scheme, the controller is configured to assign a highest priority to storing energy and a next highest priority to engaging non-wear components of the braking and retardation system to dissipate energy.

17. The work vehicle of claim 15, wherein in allocating the energy according to the hierarchal energy allocation scheme, the controller is configured to:
   perform a first energy subtraction by providing charging energy to the energy storage device; and
   perform a second energy subtraction, after the first energy subtraction, by supplying energy to the brake resistor.

18. The work vehicle of claim 17, wherein the controller is configured to:
   measure a voltage on a DC bus in the work vehicle after the first and second energy subtractions, the DC bus electrically coupled to the brake resistor and the one or more electric machines;
   determine if the voltage is above a DC bus voltage threshold; and
   when the voltage is above the DC bus voltage threshold, reduce a level of the braking torque demand.

19. The work vehicle of claim 17, wherein the braking and retardation system further comprises axle service brakes and engine accessories, the engine accessories including one or more of an alternator, an HVAC compressor, and vehicle cooling fans.

20. The work vehicle of claim 19, wherein in allocating the energy according to the hierarchal energy allocation scheme, the controller is configured to:
   perform a third energy subtraction, after the second energy subtraction, by supplying energy to the engine accessories;
   perform a fourth energy subtraction, after the third energy subtraction, by supplying energy to the engine brake and the axle service brakes; and
   perform a fifth energy subtraction, after the fourth energy subtraction, by controlling the transmission to perform the transmission braking.

* * * * *